(12) United States Patent
Trapani et al.

(10) Patent No.: US 9,128,302 B2
(45) Date of Patent: Sep. 8, 2015

(54) METHOD AND APPARATUS FOR MAKING POLARIZED SUNGLASSES

(71) Applicants: Giorgio Trapani, Cambridge, MA (US); Robert K. Tendler, Chestnut Hill, MA (US)

(72) Inventors: Giorgio Trapani, Cambridge, MA (US); Robert K. Tendler, Chestnut Hill, MA (US)

(73) Assignee: Distributed Polarization Inc., Boston, MA (US)

( * ) Notice: Subject to any disclaimer, the term of this patent is extended or adjusted under 35 U.S.C. 154(b) by 129 days.

(21) Appl. No.: 13/998,388

(22) Filed: Oct. 28, 2013

(65) Prior Publication Data
US 2015/0116658 A1    Apr. 30, 2015

(51) Int. Cl.
*G02C 7/12*    (2006.01)

(52) U.S. Cl.
CPC .................................... *G02C 7/12* (2013.01)

(58) Field of Classification Search
CPC ............... G02C 7/12; G02C 7/10; G02B 5/30
USPC ........... 351/49, 45, 46, 44, 41, 163, 165, 159; 359/485, 490, 501
See application file for complete search history.

(56) References Cited

U.S. PATENT DOCUMENTS

| | | | | |
|---|---|---|---|---|
| 1,637,406 A | * | 8/1927 | Brumder | 473/210 |
| 2,334,446 A | | 11/1943 | Sewell | |
| 2,511,329 A | * | 6/1950 | Craig | 351/47 |
| 3,628,854 A | * | 12/1971 | Jampolsky | 351/159.58 |
| 4,915,495 A | | 4/1990 | Takeuchi | |
| 5,617,153 A | * | 4/1997 | Allen et al. | 351/45 |
| 5,764,333 A | * | 6/1998 | Somsel | 351/47 |
| 6,003,990 A | * | 12/1999 | Einhorn | 351/45 |
| 6,113,233 A | * | 9/2000 | Miller | 351/46 |
| 6,623,116 B2 | | 9/2003 | Kerns et al. | |
| 7,374,282 B2 | | 5/2008 | Tendler | |
| 7,506,976 B2 | | 3/2009 | Baiocchi et al. | |
| 8,172,393 B2 | | 5/2012 | Tendler | |
| 8,702,230 B2 | * | 4/2014 | Yi et al. | 351/45 |
| 2004/0046927 A1 | | 3/2004 | Montgomery | |
| 2005/0157248 A1 | * | 7/2005 | Heisman | 351/46 |
| 2005/0237440 A1 | | 10/2005 | Sugimura et al. | |
| 2007/0046888 A1 | | 3/2007 | Kurzrok | |
| 2009/0257018 A1 | * | 10/2009 | Shea et al. | 351/45 |
| 2011/0205471 A1 | | 8/2011 | Wang et al. | |
| 2012/0069264 A1 | | 3/2012 | Inoue | |
| 2012/0133859 A1 | | 5/2012 | Cha et al. | |
| 2012/0229732 A1 | | 9/2012 | Koike et al. | |
| 2013/0063684 A1 | | 3/2013 | Chen et al. | |

* cited by examiner

*Primary Examiner* — Huang Dang
(74) *Attorney, Agent, or Firm* — Hayes Soloway PC

(57) ABSTRACT

In the manufacture of gradient polarized sunglasses an optical retarder is used in front of a portion of a polarized lens to destroy the linear polarization of incoming light to render that portion of the sunglass lens non-polarized, thus to permit viewing of polarized displays through that non-polarized portion of the polarized sunglass lens.

12 Claims, 6 Drawing Sheets

METHOD AND APPARATUS FOR MAKING POLARIZED SUNGLASSES

FIELD OF THE INVENTION

This invention relates to polarized sunglasses and more particularly to the utilization of a depolarizer over a portion of the polarized sunglasses to depolarize a portion of the polarized sunglass lens.

BACKGROUND OF THE INVENTION

As described in U.S. Pat. No. 7,374,282 issued May 20, 2008 and U.S. Pat. No. 8,172,393 issued May 8, 2012 a system is shown for providing a pair of sunglasses with a polarized region in the upper portion of the eyeglass lens and a non-polarized region at the bottom of the eyeglass lens so as to permit reading of polarized instruments through the non-polarized region.

In these patents for providing such a gradient polarized pair of sunglasses it is said that the polarizing material is differentially stretched such that at the top region of the sunglasses there is a maximum stretch to provide maximum polarization, whereas at the bottom portion of the sunglass lenses there is little or no stretching, thereby destroying the polarization characteristic of the lens in the lower region of the sunglasses.

It will be appreciated that while such a technique is technically feasible it is somewhat difficult to implement without for instance optical distortion. There is therefore a need to be able to provide an implementation of the gradient polarization sunglasses which is easy to manufacture and which is inexpensive, while at the same time preserving optical quality throughout the extent of the sunglass lenses.

By way of background, for polarized displays such as those in mobile phones, and as illustrated in U.S. Patent Publication No. 2013/0063684, a quarter wave retardation film is applied to a front polarizer on the display device. Glare due to sunlight reflected at the outer surface of the display panel can be reduced by viewing the display through polarized sunglasses and placing this quarter wave plate on the LCD display device results in making the display more visible through the polarized sunglasses.

The destruction of polarization on the polarized displays of handheld mobile devices and other polarized displays is shown in the following U.S. Patent Application Publications, namely 2012/0229732; 2012/0133859; 2012/0069264; 2011/0205471; and 2005/0237440.

All of these systems are utilized to improve the readability of a liquid crystal display in which a polarized film is applied to the display itself. Note that the quarter wave plates or other retarders have not been applied to sunglasses for any purpose much less to be able to read a polarized display in one region of the sunglass while at the same time providing a polarized version of a scene in another portion of the sunglass.

There is therefore a need to be able to implement the manufacture of gradient polarized sunglasses without having to differentially stretch polarization material within the lenses.

SUMMARY OF INVENTION

Rather than stretching polarized material in polarized sunglass lenses, in the subject invention a depolarizer in the form of an optical retarder is positioned in front of the polarized sunglass lenses to alter the state of polarization of the polarized light entering into the sunglasses such that what is viewable from behind the sunglasses by the individual wearing the sunglasses is equivalent to an unpolarized field of view. If for instance the individual wearing the subject sunglasses wishes to view a polarized display then the individual looks through the unpolarized portion of the sunglasses to be able to successfully view the display. When viewing a scene through the upper portion of the polarized sunglasses an individual is able to obtain the benefit of polarized sunglass. In one embodiment the optical retarder is a quarter wave plate.

It will be appreciated that while the subject invention is described in terms of the utilization of a quarter wave plate which destroys the linear polarization of incoming light and makes it circularly polarized, any transparent depolarizing material may be used, and which may in fact be an optical retarder with more than 5-6 full wave retardation with normal dispersion of birefringence.

In one embodiment of the subject invention a polarized lens has a quarter wave depolarizer adhered to the front surface of the lens. It will be appreciated that in this embodiment there may be a visible line on the sunglasses at the boundary between the top portion of the quarter wave strip and the remainder of the polarized sunglass lens. This is because the refractive index of air is 1.0, whereas the refractive index of the polarized lens is approximately 1.5. This difference in refractive indices can produce a visible line on the sunglass lens which may be objectionable to the wearer of the sunglasses or one who views an individual wearing the sunglasses.

While this type of quarter wave depolarizer element stuck on the surface of a polarizing lens does in fact provide for viewing of polarized displays, in a second embodiment to eliminate the boundary line a sandwich structure includes a polarized lens in the middle surrounded by glass covers, with the quarter wave or depolarizing element in between the polarized lens and the outer cover.

Adhesive is then utilized in the sandwiched structure in which the adhesive matches the refractive index of both the polarizer and the glass covers. The result is that it is virtually impossible to see the line demarcating the top of the depolarizing strip and the remainder of the polarized sunglass lens due to refractive index matching provided by the adhesive.

In yet another embodiment of the subject invention a polarized lens may be provided an orientable clear plastic sheet in which the upper portion of the sheet has a vertical machine direction and in which the lower portion of the clear plastic sheet is stretched at 45 degrees with respect to the machine direction of the upper portion of the sheet. This stretching is easily accomplished and provides and optical thickness approximating a quarter wave retarding element. This element is then laminated to the polarized lens so that the orientation direction of the element is at 45 degrees to the polarization axis of the polarized lens.

Regardless of the manner in which polarization is destroyed at the front portion of the polarized sunglass lenses, linearly polarized light entering the sunglasses at least in a bottom portion of the sunglasses has its polarization destroyed. This provides the ability to view a polarized display by looking downwardly through the unpolarized portion of the sunglass lens, thereby to be able to view polarized displays with a gradient polarized pair of sunglasses.

By way of definition as used herein the term depolarized is used to mean an alteration of the state of polarization which is equivalent to depolarization.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
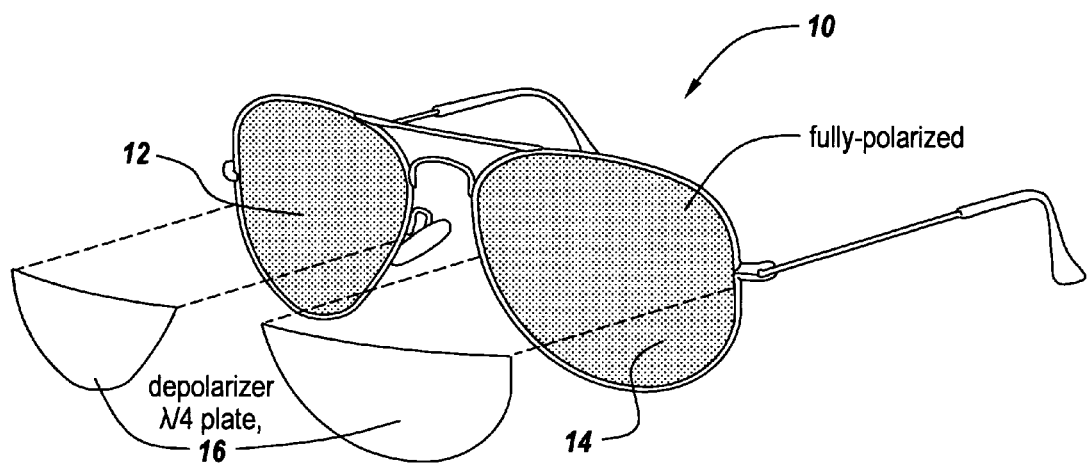
FIG. 1 is an exploded view of the manufacture of a gradient pair of sunglasses in which a depolarizer quarter wave plate is adhered to the front surface of the polarized lenses.

Referring now to FIG. 1, a fully polarized pair of sunglasses 10 is provided with fully polarized lenses 12 and 14. Were a polarized display to be viewed by such a pair of sunglasses extinguishing due to cross polarization would occur making the polarized display seem black.

In order to avoid this effect, in one embodiment a pair of depolarizers 16 and 18 is applied to the front surfaces of polarized elements 12 and 14 for converting the state of the polarization of linearly polarized light so that what reaches the interface between the depolarizer and the polarized elements is circularly polarized and thus allowed to go through the linearly polarized lens rather than being extinguished due to cross linear polarization.

Figure 2:
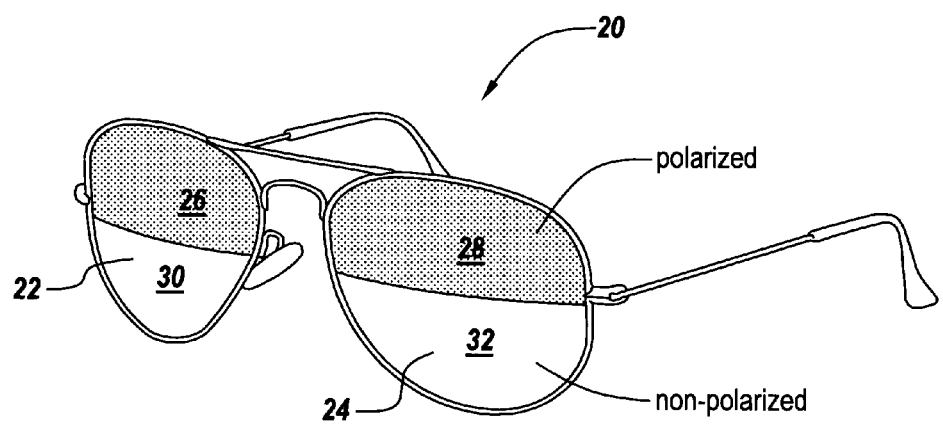
FIG. 2 is a diagrammatic illustration of the effect of the adhering of the depolarizer to the front portion of the sunglass lenses of FIG. 1 showing that there is a depolarized portion of the sunglasses for the viewing of polarized displays.

As illustrated in FIG. 2, such a pair of gradient polarized sunglasses includes regions 26 and 28 which are fully polarized, whereas due to the utilization of the depolarizing elements in front of the polarized lenses there are nonpolarized sections 22 and 24 such that in effect the lenses are nonpolarized at the regions 30 and 32.

It has been found that by sticking on quarter wave retarders onto the front of polarized lenses an individual wearing such polarized sunglasses may in fact view a polarized display by looking downwardly through regions 30 and 32 towards a polarized display.

Figure 3A:
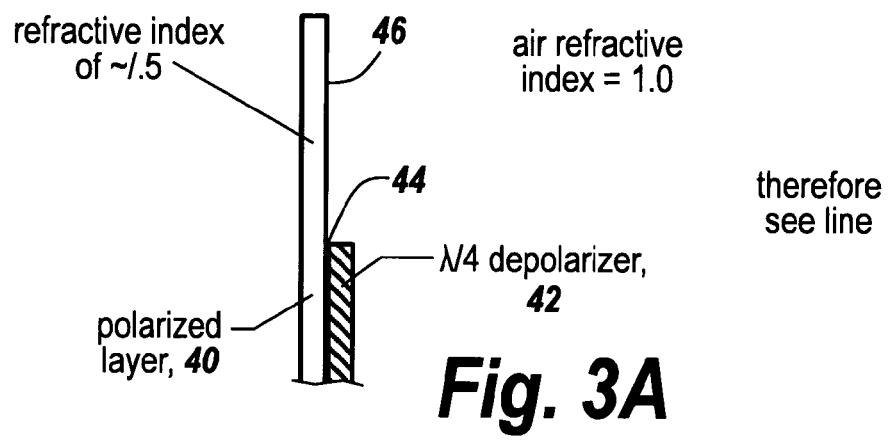
FIG. 3A is a diagrammatic illustration of one embodiment of a method of manufacture of a gradient polarized sunglass lens illustrating the adhering of a depolarizer in the form of a quarter wave plate to the front surface of a polarized sunglass lens.

Referring now to FIG. 3A, in one embodiment a cross section of the lenses of FIG. 2 is shown in which there is a linearly polarized layer 40 to which is laminated a depolarizer 42 which in one embodiment is a quarter wave plate. It will be appreciated that there is an air interface between the top boundary 44 of depolarizer 42 and polarized layer 40. The result is that there will be a noticeable line either when viewing the pair of sunglasses worn by an individual or plate by an individual looking outwardly from the polarized sunglasses. The reason for this is that the refractive index of the polarized layer 40 is on the order of 1.5, whereas air refractive index of air is 1.0. This difference in refractive index at boundary 44 causes boundary 44 to be visible and is in some senses undesirable, although sunglasses manufactured in this manner will in fact provide the unpolarized view of a polarized display while providing a polarized view of a scene.

Figure 3B:
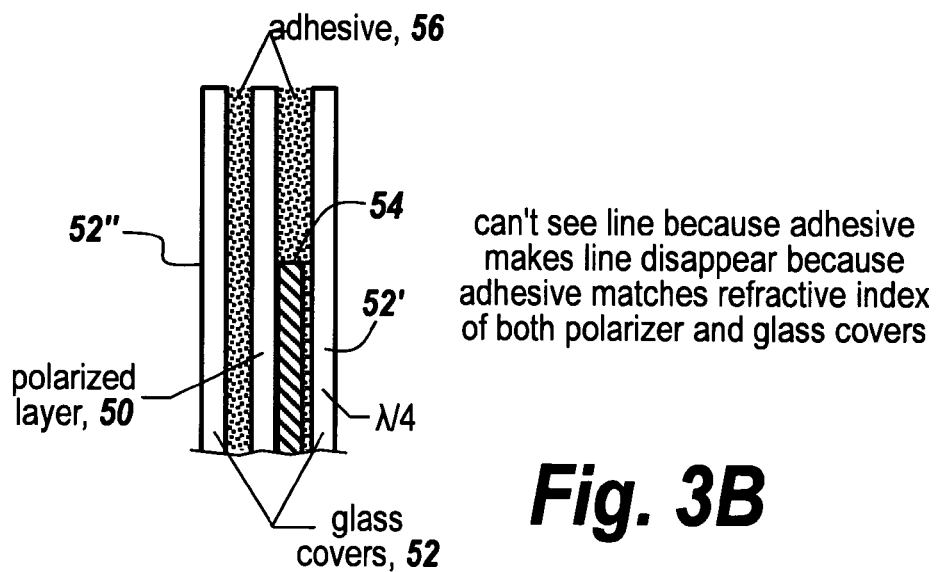
FIG. 3B is a diagrammatic illustration of a sandwich structure for minimizing the visible boundary line between a depolarizer and the remainder of the polarized lens illustrating a polarizer sandwiched between two covers, with adhesive used to laminate the sandwich to get matching the refractive index of both the polarized lens and the covers.

In order to eliminate the visible boundary line, in one embodiment shown in FIG. 3B a polarized layer 50 is sandwiched between two transparent covers 52, in one embodiment glass covers, with the retarder element 54 being positioned between polarized layer 50 and the front cover here shown at 52'.

This sandwich structure is adhered together utilizing an adhesive 56 which is disposed between rear cover 52" and polarized layer 50 and between front cover 52' and polarized layer 50. The adhesive is chosen so that the refractive index of the adhesive matches the refractive index of both the polarizer and the covers, thereby to minimize any difference in refractive index between retarder 54 and other elements of the sandwiched structure.

As to the types of adhesives that are useable in the subject application, one can use thermal epoxy optical adhesives or a UV-cured optical adhesive. One thermal epoxy is available as EPO-TEK 301 from Epoxy Technology, Inc. of Billerica, Ma.

Figure 3C:
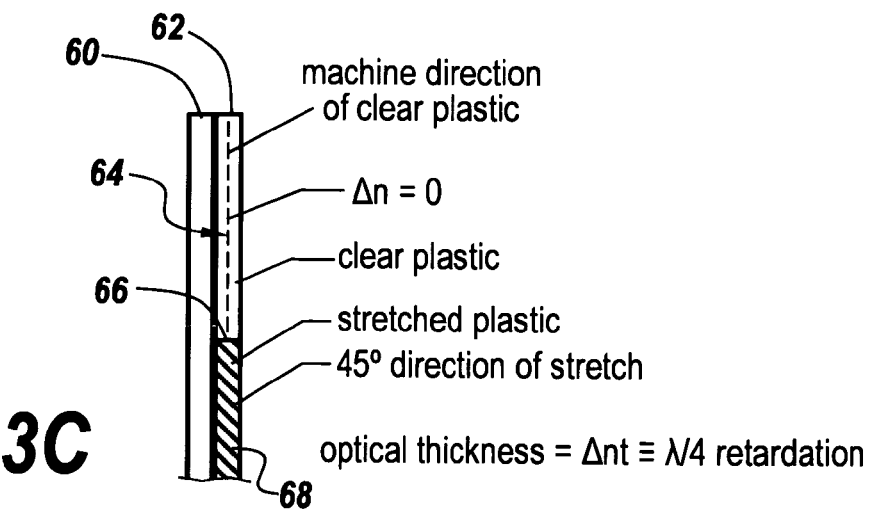
FIG. 3C is a diagrammatic illustration of the utilization of an unlaminated clear plastic sheet over the front surface of a polarized lens in which the bottom portion of the unlaminated clear plastic sheet is stretched in a direction 45 degrees to the machine direction of the plastic sheet, thereby to provide an optical thickness in the stretched portion that approximates a quarter wave retarding element.

Referring now to FIG. 3C, in another embodiment a polarized layer 60 is provided with an unlaminated clear plastic sheet 62 which due to its manufacture has a vertical viewable direction as illustrated by line 64. Here it can be seen that a boundary 66 is formed between the upper portion of clear plastic sheet 62 and a lower portion 68 which is in fact stretched at a 45 degree angle with respect to the machine direction of the clear plastic sheet. By stretching the clear plastic sheet below boundary 66 so as to form a stretched portion 68 the optical thickness associated with the stretched portion has an optical thickness equal to $\Delta nt = \lambda/4$ to provide optical retardation. The result is that the boundary 66 is virtually invisible using a simple manufacturing to provide depolarizing in front of a polarized lens.

Figure 4A:
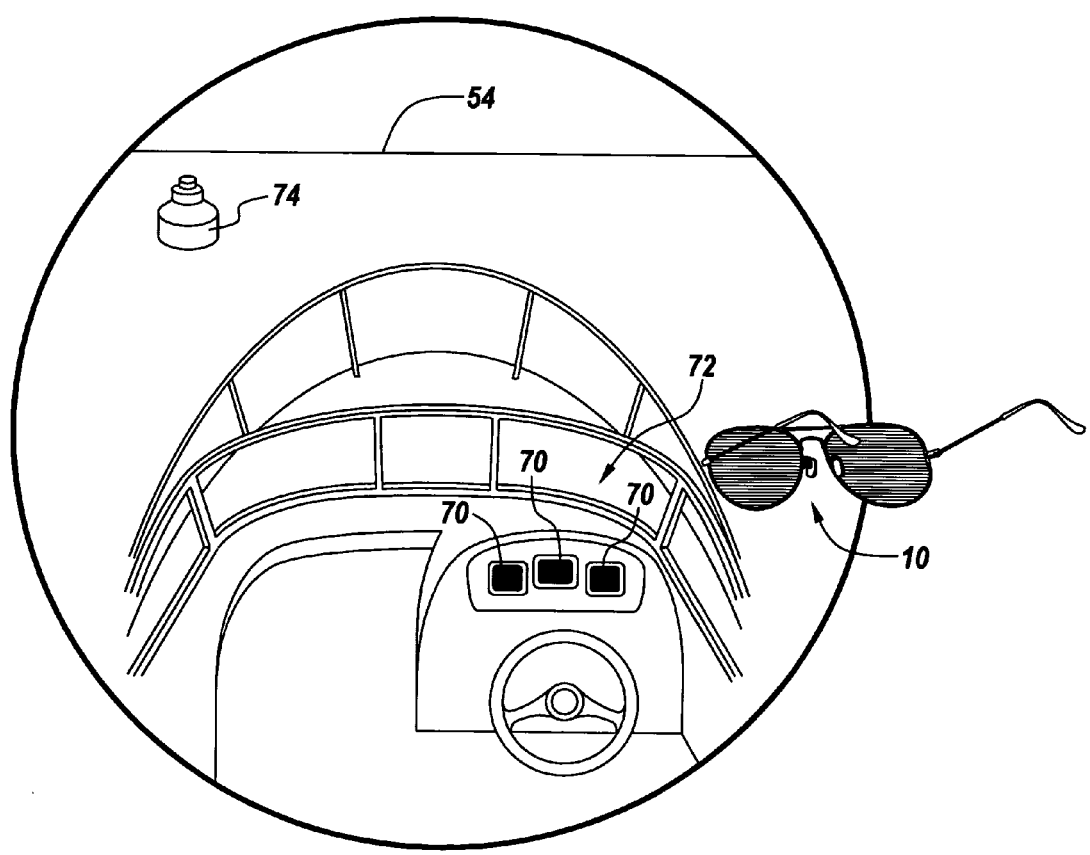
FIG. 4A is a diagrammatic illustration of the view of polarized instruments on a vessel when viewed by polarized sunglasses, illustrating that the displays are black due to cross polarization between the polarization of the polarized displays and the polarization of the sunglasses.

As illustrated in FIG. 4A, which polarized sunglasses 10 are used to view polarized displays 70 on board a vessel 72 due to the polarization of these displays they appear black. While an object in a scene, here a buoy 74, can be viewed through the polarized sunglasses 10 without difficulty, the polarized displays cannot be viewed by such a pair of polarized sunglasses.

Figure 4B:
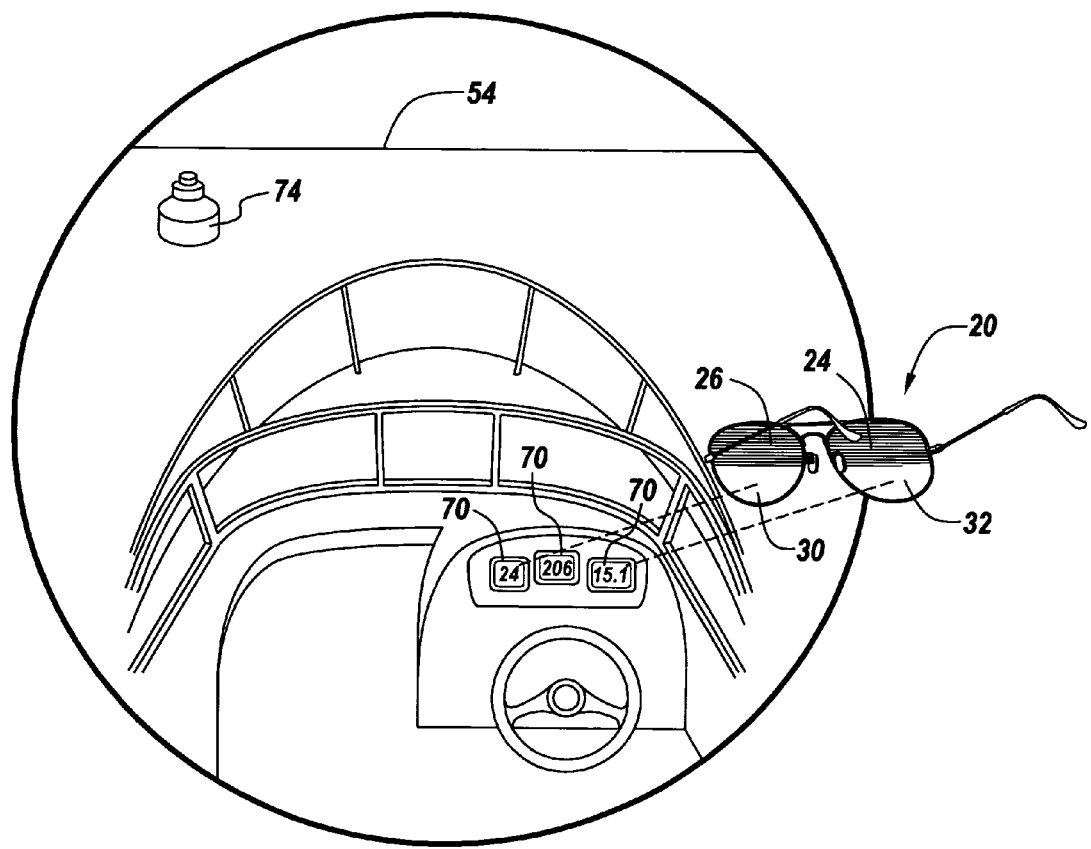
FIG. 4B is a diagrammatic illustration of the polarized displays of FIG. 4 when viewed with gradient polarized sunglasses illustrating that indicia on the displays is visible when viewed through the unpolarized portion of the gradient polarized sunglasses, whereas a distant object is made more visible by virtue of the fact of viewing the object through the polarized portion of the gradient sunglasses.

However, referring to FIG. 4B, when a gradient polarized pair of sunglasses 20 is utilized, polarized displays 70 have indicia clearly visible through the bottom portions 30 and 32 of the subject gradient polarized sunglasses due to the conversion of the state of the polarization due to the optical retarder. Here it can be seen that buoy 74 viewed through polarized portions 26 and 28 of the gradient polarizer is viewed as would normally be viewed using standard polarized sunglasses.

Figure 5:
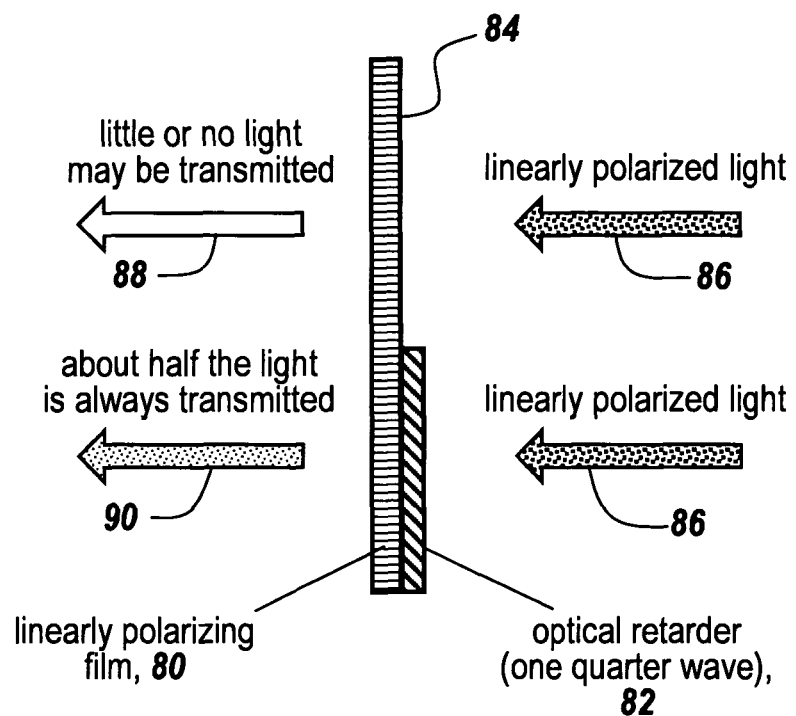
FIG. 5 is a diagrammatic illustration of utilizing an optical retarder in front of a linearly polarized film such that at least a portion of the linearly polarized light improving on the sunglasses through the optical retarder is viewable from the back side of the polarized lens, thus to be able to view a polarized display through the portion of the sunglass lens on which the optical retarder is located.

Referring to FIG. 5, in the theory of operation of the subject invention a split field linear/circular polarizing filter scenario is shown in which one has a linear polarizing film 80 and an optical retarder 82 adhered to the front surface 84 of the linear polarized film. In normal operation, linearly polarized light 86 is extinguished by the polarizing film such that little or no light is transmitted as illustrated by grey arrow 88 at the back side of the linearly polarized film.

However, by providing an optical retarder to convert the linear polarization of the incident linearly polarized light 86, polarization is converted such that in effect the light is circularly polarized. When this circularly polarized light impinges upon linearly polarizing film 80 a portion of the polarized light here shown by arrow 90 exits the rear surface of the linearly polarized film such that if a polarized display is being viewed through the optical retarder its indicia will nonetheless be visible although at about half the light amplitude of the light impinging on the optical retarder.

Figure 6:
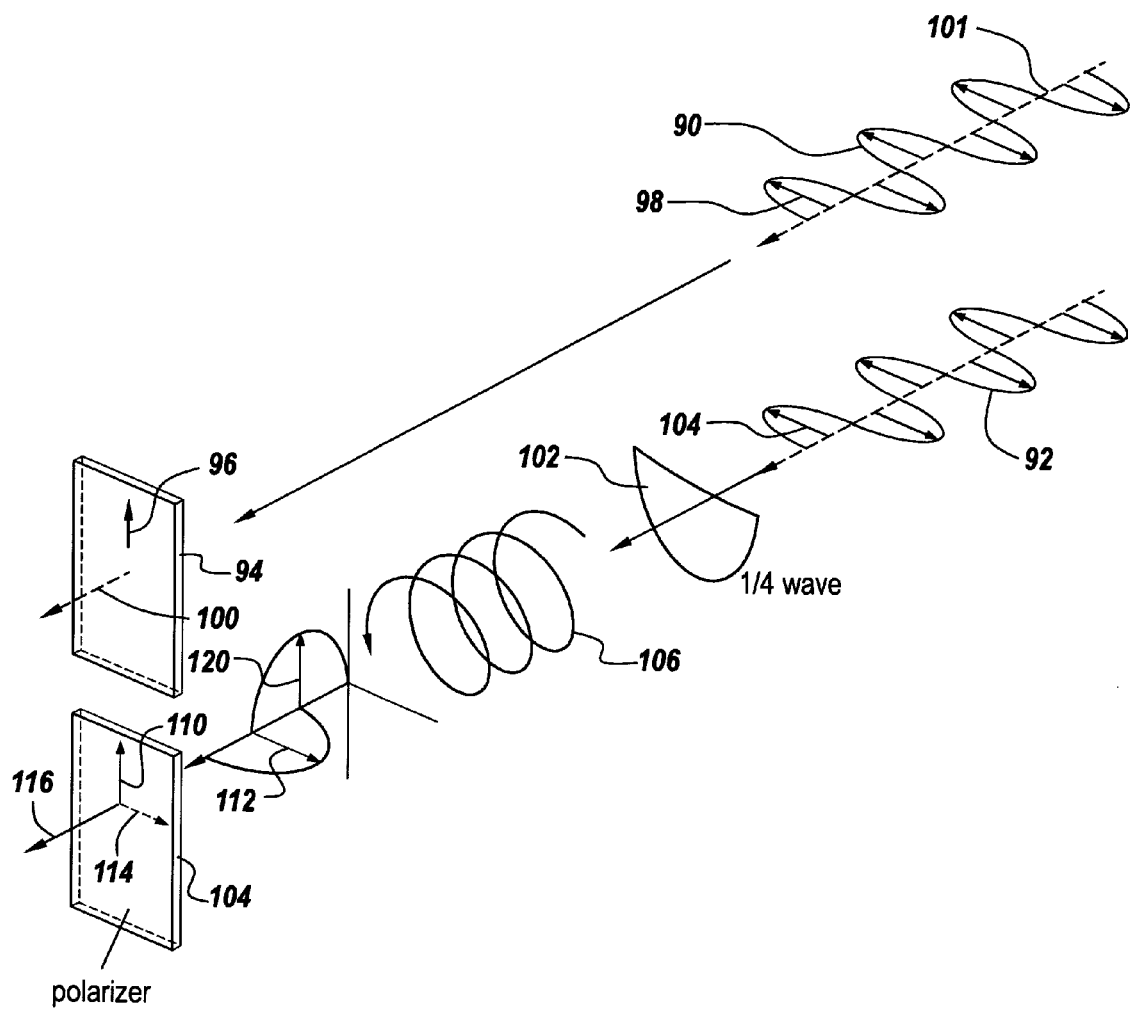
FIG. 6 is a diagrammatic illustration of the conversion of linearly polarized light into circularly polarized light utilizing a quarter wave retarder to allow viewing of a polarized display through this portion of the lens regardless of the relative orientation of the plane of polarization of the impinging light and a linearly polarized lens.

Referring to FIG. 6, how this is achieved is shown by linearly polarized wave forms 90 and 92. Wave form 90 impinges upon a polarizing element 94 which is linearly polarized as illustrated by vector 96 such that when the direction of vector 96 is orthogonal to the direction 98 of the impinging polarized light, the light is extinguished as illustrated by dotted line 100.

On the other hand when linearly polarized light 92 impinges on a quarter wave element 102 the linearly polarized light as illustrated by 104 is converted as illustrated at 106 into a circularly polarized pattern. This pattern is equivalent to two orthogonal components with a relative phase lag of one quarter of a wave such that when light from the retarder impinges upon a polarizer 108 having a vertical polarization direction 110, the vertical component 120 passes through the polarizer having a polarization direction 110 and the horizontal component 112 is extinguished as illustrated by dotted line 114 because it is crossed with direction 110.

However, for the light that passes through the retarder and that impinges upon polarizer 108 that has a vector 120 parallel to vector 110 this light passes through polarizer 108 as illustrated at 116.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for fabricating sunglasses having a polarized region and an un-polarized region comprising the steps of:
   providing polarized sunglass lenses; and,
   overlying the front portion of the polarized lenses with an optical retarder whereby polarized light impinging on the optical retarder is depolarized providing an un-polarized portion of the sunglass lens.

2. The method of claim 1, wherein the optical retarder includes a sheet of transparent material having a quarter wavelength thickness.

3. The method of claim 1, wherein the optical retarder includes a transparent sheet having phase retardation equal to several full wavelengths.

4. The method of claim 1, wherein the optical retarder includes a top edge and wherein the boundary between the top edge of the optical retarder and the underlying polarized lens is visible.

5. The method of claim 1, wherein the sunglass lens includes a polarized layer sandwiched between transparent covers and wherein the optical retarder is interposed between the polarized layer and a top cover, the sandwiched elements being adhered together with an adhesive having a refractive index which matches the refractive indices of the polarized layer and the transparent covers.

6. The method of claim 5, wherein the transparent covers are made of glass.

7. The method of claim 6, wherein the adhesive is taken from the group consisting of a thermal epoxy optical adhesive.

8. The method of claim 6, wherein the adhesive is an UV cured optical adhesive.

9. The method of claim 1, wherein the optical retarder comprises a sheet of clear plastic material, the clear plastic material having a machine direction parallel to the polarizing direction of the polarized lens and wherein the bottom portion of the clear plastic sheet is stretched so as to produce a quarter wave thickness at 45 degrees to the polarization direction of the polarized lens.

10. The method of claim 9, wherein the clear plastic sheet is stretched in a direction 45 degrees to the machine direction.

11. The method of claim 1, wherein the optical retarder includes a clear plastic sheet having a portion thereof stretched in a direction 45 degrees with respect to the machine direction of the clear plastic sheet to provide an optical thickness in the stretched portion equivalent to a quarter wave retardation.

12. The method of claim 11, wherein the demarcation between the stretched portion of the clear plastic sheet and the unstretched portion is invisible.

\* \* \* \* \*